United States Patent [19]

Benier

[11] Patent Number: 4,555,226
[45] Date of Patent: Nov. 26, 1985

[54] APPARATUS FOR ROLLING DOUGH AND COILING IT

[75] Inventor: Johan Benier, Vught, Netherlands

[73] Assignee: Benier B.V., 's-Hertogenbosch, Netherlands

[21] Appl. No.: 453,179

[22] Filed: Dec. 27, 1982

[30] Foreign Application Priority Data

Dec. 29, 1981 [NL] Netherlands .................. 8105893

[51] Int. Cl.$^4$ .................. A21C 3/02; A21C 3/06
[52] U.S. Cl. .................. 425/96; 425/101; 425/320; 425/363
[58] Field of Search ........ 426/496, 500, 501, 502; 425/96, 101, 106, 319, 320, 321, 322, 334, 363

[56] References Cited

U.S. PATENT DOCUMENTS

| | | | |
|---|---|---|---|
| Re. 22,399 | 12/1943 | Fonken | 425/320 |
| 1,185,800 | 6/1916 | Hoiles | 425/106 |
| 1,692,322 | 11/1928 | Aiken | 425/96 |
| 1,805,018 | 5/1931 | Scruggs | 425/320 |
| 2,246,477 | 6/1941 | Attaway et al. | 425/328 |
| 2,337,539 | 12/1943 | Buechek | 425/106 |
| 2,479,864 | 8/1949 | Rhodes | 425/320 |
| 2,791,974 | 5/1957 | Copenhaver et al. | 425/367 |
| 3,116,703 | 7/1964 | Enoch et al. | 425/320 |

FOREIGN PATENT DOCUMENTS 8105893 5/1907 France .

Primary Examiner—Willard E. Hoag
Attorney, Agent, or Firm—Brumbaugh, Graves, Donohue & Raymond

[57] ABSTRACT

A dough make-up machine comprising a rolling-out station having a roller and a carrier for dough pieces, as well as a rolling-up station, while in front of the rolling-up station, there are disposed a moistening roller having a moisture-retaining, roughened surface and means for moistening the roller surface.

5 Claims, 2 Drawing Figures

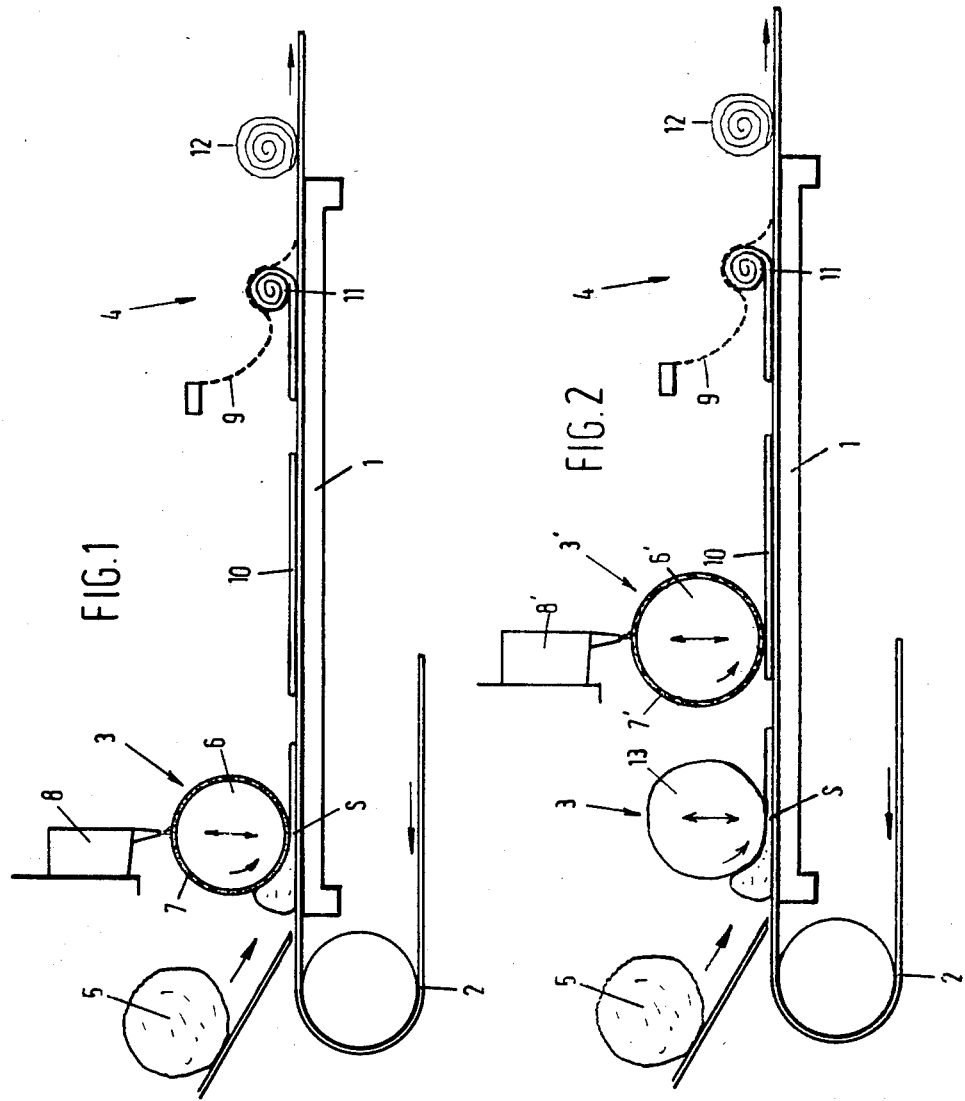

APPARATUS FOR ROLLING DOUGH AND COILING IT

The invention relates to a method of making up dough in which dough balls are rolled out to slabs which are then rolled up.

The make-up aims at removing as much as possible gases from the dough, and without adverse effect on the elasticity of the dough, to at least break large gas bubbles, thereby obtaining a regular fine pore structure in the baked product. Likewise the dough masses are brought in a required form wherein they can be placed in baking tins and be baked after an after-proofing process.

A generally recognized drawback of the known make-up technique is that during the rolling out, the moisture present in the dough mass is driven to one end, viz. the trailing end of the dough slab moving through a rolling-out station and, in particular if rolled out to a thin layer, the remaining portion of the dough slab is mostly so dry that during rolling up, the windings have no or insufficient adhesion and coalescence, so that the baked end product fails to obtain the contemplated homogeneous crumb structure. The spiral bounding the successive windings as a matter of fact impedes a uniform after-proofing and also remains visible and/or forms a fracture zone in the end product.

Various techniques have already been proposed to eliminate the drawback of non-uniform moisture distribution in the make-up dough.

One technique is described in U.S. Pat. No. 2,791,974, and comprises the production of a dough slab having a thinner portion and a thicker portion, which therefore contains a relatively substantial quantity of moisture and which functions as "moisture reservoir", from which in the subsequently formed roll, the thinner, drier portion in the centre of the roll is moistened. Consequently, this technique does not allow rolling out to a thin layer.

Another proposal is described in U.S. Pat. No. 2,479,864, wherein it is tried to correct the non-uniform moisture distribution produced by rolling out a dough ball by rolling out the dough slab a second time, starting at the wet end, with the object to force moisture therefrom towards the drier portion. This method, too can only be effected if no excessive thinning takes place. Moreover, in general the repeated rolling out of the same dough mass should be considered unfavourable. In fact, it is known that dough, after some force has been exerted thereon, needs some time to recover, in particular in the surface zones, its structure, so its elasticity. To avoid overload and hence permanent damage to the dough structure, a rest break should consequently be observed in theory between two rolling out operations, which reduces the pace of the method and also the capacity of the machine employed.

Both known techniques are based on the recovery of the moisture distribution in a dough mass disturbed by the rolling out by means of some redistribution of the original moisture quantity.

It is the object of the invention to avoid the drawback of rolling up a rolled out dough slab having a relatively dry zone and hence insufficient adhesion of the windings in the roll without thereby introducing the drawbacks and limitations of the earlier proposals and which enables rolling out to a very thin layer and producing a roll having a relatively large number of windings.

To this end, the dough, before being rolled up, is moistened on at least one side.

It is thus ensured that there is always and everywhere sufficient moisture between the windings for coalescing the windings under the influence of the after-proofing process, i.e. to obtain throughout the dough roll a homogeneous structure, irrespective of the extent of rolling out. This enables a thinning to a very thin layer in one operation and the production of a roll having a large number of windings which, during the after-proofing, completely coalesce. It is known that the larger the number of windings in a roll of a given diameter, the finer and more regular the dough structure becomes.

Preferably, the moistening of the dough is effected during the rolling out thereof. In this way, use is made of the surface structure of the dough being temporarily slightly disturbed during the rolling out of a dough slab to introduce the moisture into the surface of the dough slab. The moisture then remains fixed in the dough slab surface and can then spread through the transition zone of successive windings in the roll formed. The solid components of the dough are dispersed in the moisture mass and the boundary between two windings disappears entirely.

For performing the method, the invention provides a dough make-up machine comprising a rolling out station with a roller and with a carrier for dough pieces, as well as a rolling up station, which machine is characterized in that there are disposed in front of the rolling up station, a moistening roller having a moisture-retaining roughened surface, and means for moistening the roller surface.

The moistening roller, due to the roughened surface thereof, is adapted to open the surface pores of the dough pieces and the moisture present in the roller surface is thus forced into the surface zone of the dough slab.

In practice, good results have been obtained with a moistening roller having a coating of felt-like material.

Since in case an excessive pressure in the gap between the moistening roller and the carrier, the moisture present in the roller surface can be pressed forward and backward, instead of being pressed into the dough slab surface, resulting in an irregular dough moistening, means are preferably provided for adjusting the gap height to the size of the dough pieces being treated.

In a variant embodiment of the dough make-up machine, for moistening the dough during the rolling out thereof, the roller may be designed as moistening roller, and be fitted with a moisture-retaining roughened surface which is moistened by moisture supply means. The roughened roller surface increases the grip on the dough for the transport through the roller gap and at the same time opens the pores for introducing moisture into the dough.

Preferably, the roller in the rolling out station coacts with a carrier, which likewise extends through the rolling up station and coacts in situ with rolling up members, which carrier has a smooth surface of a closed structure.

Due to these surface properties of the carrier, a dough mass rolled out thereon and moistened at the top remains on the carrier without air inclusions and the carrier retains the dough slab formed thereon until a roll is formed in the rolling up station from the dough slab. The dough slab will thus have no opportunity of shrinking under the influence of the inherent elasticity until during the rolling up. In the formed roll, the prevailing shrinkage contributes to the forming of a firm roll, which is favourable for the contemplated coalescence of the windings.

French Pat. No. 373,646 discloses per se to moisten a rolled out dough piece by means of smooth rollers. A resulting flat dough piece is not further rolled up.

Some embodiments of the dough make-up machine according to the invention will now be described, by way of example, with reference to the accompanying drawings, in which:

FIG. 1 shows the dough make-up machine having a combined rolling out and moistening roller, and FIG. 2 shows an embodiment having a separate moistening roller.

According to the drawings, which diagrammatically exclusively show elements of the dough make-up machine necessary for a proper understanding of the invention, said machine is fitted with a driven endless conveyor belt 2 sliding over a table 1, said belt having a smooth surface of closed structure. Above said table there are disposed in the embodiment shown in FIG. 1, a rolling out station 3 and a rolling up station 4. Dough balls 5 are fed to the rolling out station 3. In the rolling out station 3 there is operative a roller 6 coated with felt or like rough and moisture-retaining material. In the drawing, the felt layer is indicated by numeral 7.

Above roller 6, there is shown a water supply reservoir 8 from which the felt layer is moistened.

The rolling up station 4 may be of any known type. In the drawing, there is shown a freely suspended wire net 9 for forming supplied dough slabs to a roll.

During operation of the machine, dough balls 5 are rolled out between the roller 6 and the smooth conveyor belt 2 functioning as a carrier to form dough slabs 10. The dough slabs 10 have been moistened to within their top surface through the effect of the felt layer 7. They adhere with their underside to the carrier 2 without the possibility of shrinkage under the influence of its natural elasticity. Once arrived underneath the wire net 9, rolls are formed from the dough slabs 10, the windings of which are firmly pressed onto each other as a result of the then occurring elastic shrinkage of the dough slabs, so that the moisture supplied via the felt layer 7 is spread in the spiral layer 11 bounding the windings.

The completed dough rolls 12 are subjected to after-proofing and can then be baked. During after-proofing, the windings disappear completely through the effect of the supplied moisture and by dispersion of the solid particles present in the spiral zone.

To prevent the felt layer 7 from being squeezed out and hence the dough slab surface from being irregularly moistened as a result of too narrow a roller gap s between the roller 6 and the conveyor belt 2 and a concomitant excessive pressure on the felt layer 7, preferably the roller gap s is adjusted to the size of the dough pieces 5 being treated, e.g. by spring-mounting the roller 6.

In the embodiment shown in FIG. 2, use is made of a roller 13 having a smooth surface with which dough can be rolled out to a thin slab. A dough slab 10 coming out of the roller gap s passes on its way to the rolling up station 4 a moistening station 3' having a moistening roller 6' disposed under a water reservoir 8', said roller having a rough, moisture-retaining surface 7', of e.g. felt, where the dough slab surface is moistened in the same manner as happens in the embodiment according to FIG. 1 directly with the roller.

While it is conventional in the baking of bread of 500–900 g to make dough slabs during the make-up from which rolls with 2–2½ windings are formed, dough rolls with 5 or more windings can be made with the method according to the invention.

I claim:

1. A dough make-up machine having roller means for rolling out dough balls to flat slabs and coiling means for subsequently coiling the slabs to produce homogeneous cylinders for further processing in a bakery, said machine comprising a dough carrier having a smooth carrying surface for carrying the slabs from the roller means to the coiling means, said roller means having a rough, porous moisture retaining surface for rolling out dough balls on said smooth carrying surface to cause the formed slab to adhere to the surface so that the surface prevents elastic shrinking of the flat slab, and means for wetting the roller surface so that during the rolling out operation water is forced into the free surface of the slab where the surface structure of the dough is slightly disturbed by the rolling out force applied to the dough by said roller, whereby the entire dough surface and its adjacent subsurface are caused to accept moisture in a quantity such that when the slabs are subsequently coiled to cylinders there is sufficient moisture between the windings to allow them to fuse together, such fusion being further contributed to bey shrinkage of the slabs upon release from the carrier resulting in a tightening of the formed dough rolls.

2. A machine according to claim 1, including means for adjusting the gap between the moistening roller and the carrier according to the thickness of the dough pieces.

3. A machine according to claim 1 in which the moistening roller has a felt-covering to cause the moisture to impregnate the dough surface.

4. A machine according to any one of claims 1, 2, or 3 including means for supplying thick dough masses to the carrier in advance of the moistening roller so that the moistening roller flattens the dough masses while moistening the flattened surface thereof.

5. A machine according to any one of claims 1, 2, or 3 including a flattening roller disposed at the rolling out station in advance of the moistening roller for flattening thick dough masses supplied to the carrier prior to engagement by the moistening roller.

* * * * *